Figure 1:
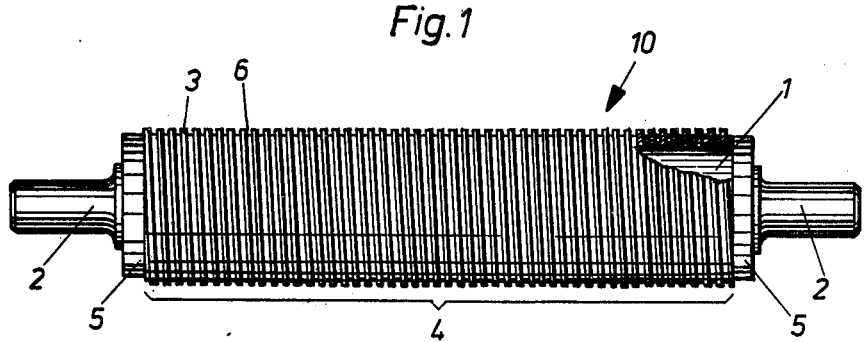

United States Patent [19]

Appenzeller

[11] 4,149,303
[45] Apr. 17, 1979

[54] ROLL

[75] Inventor: Valentin Appenzeller, Kempen, Fed. Rep. of Germany

[73] Assignee: Eduard Küsters, Krefeld, Fed. Rep. of Germany

[21] Appl. No.: 874,576

[22] Filed: Feb. 2, 1978

[30] Foreign Application Priority Data

Feb. 2, 1977 [DE] Fed. Rep. of Germany ....... 2704158

[51] Int. Cl.² .............................................. B21B 27/02
[52] U.S. Cl. ...................................... 29/121.4; 19/97;
29/148.4 D
[58] Field of Search ............... 29/121.4, 110, 148.4 D;
19/97, 112, 114, 54

[56] References Cited

U.S. PATENT DOCUMENTS

| 425,087 | 4/1890 | Sargent et al. | 19/97 |
| 1,181,971 | 5/1916 | Lovell | 29/121.4 X |
| 1,346,637 | 7/1920 | Coulston | 19/97 |

Primary Examiner—Dorsey Newton
Attorney, Agent, or Firm—Kenyon & Kenyon, Reilly, Carr & Chapin

[57] ABSTRACT

In a grooved drum with a working drum surface of metal consisting of a cylindrical inner drum on which at least one ribbon is helically wound, turn by turn, the radially outer boundary of which forms the working drum surface, the ribbon also forming axially extending circumferential grooves, a wire, radially spaced from the working drum circumference is wound between the turns of the ribbon to hold them at an axial spacing.

12 Claims, 7 Drawing Figures

U.S. Patent  Apr. 17, 1979  Sheet 1 of 2  4,149,303

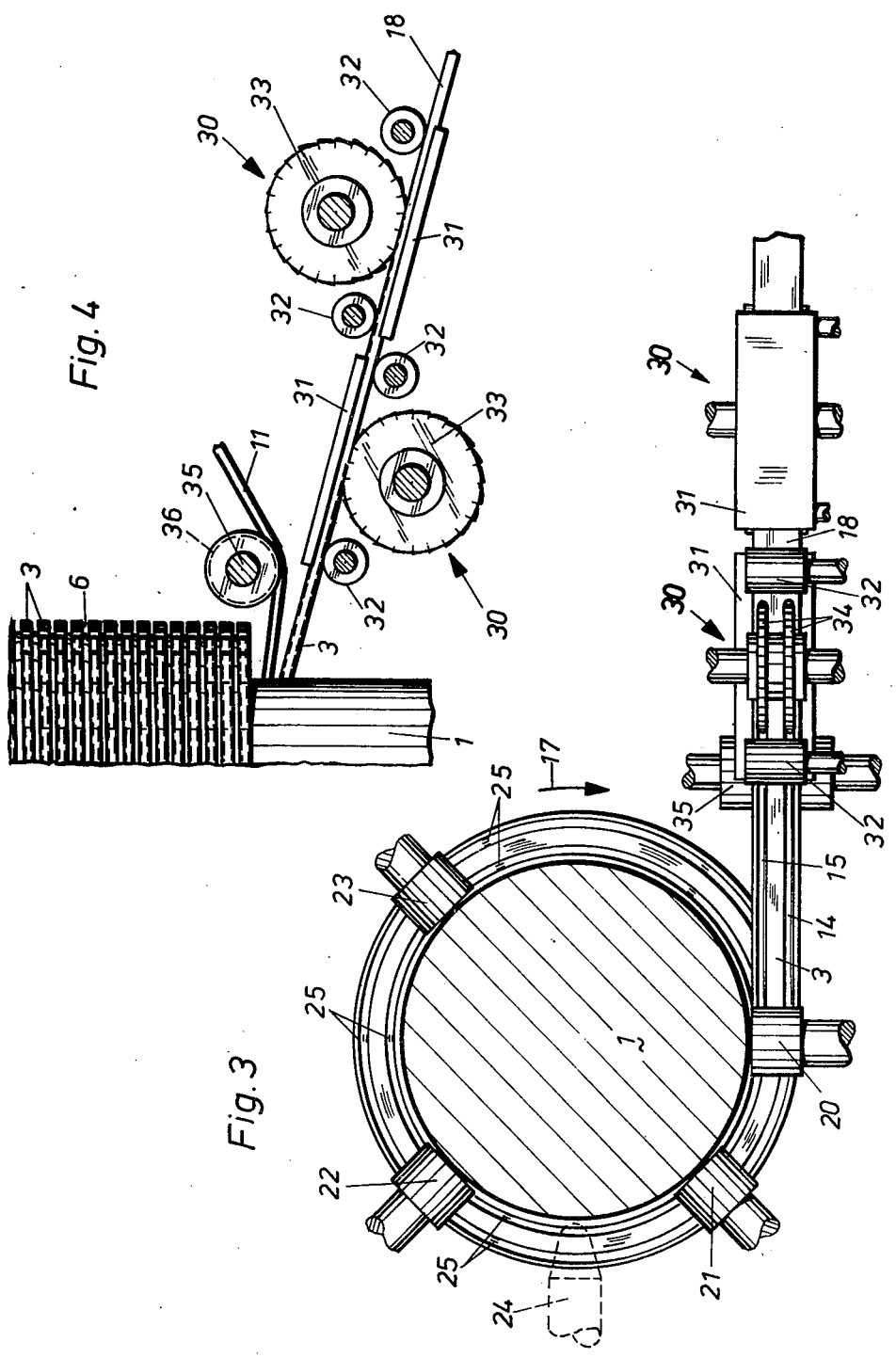

ROLL

This invention relates to a method of producing a grooved roll, more particularly for dewatering of paper, board and similar webs, having an operative roll surface consisting of metal, more particularly corrosion-resistant steel.

It has been proposed to make such a roll by winding a strip helically on a cylindrical inner roller, the strip forming the operative roll periphery and, peripheral grooves in the roll surface.

The winding of strips on an inner roll has also already been used for making elastic rolls with a plastic coating. The strips have profiles which inter-engage at the sides facing one another axially, and can be glued on the inner roll. The provision of profiles which inter-engage at consecutive turns has been proposed in the case of metal strips as well. In this proposed construction, the strip consists of a profiled material about 10-12 mm high and 2-3 mm thick. In one side surface a longitudinal groove is rolled and a corresponding longitudinal web is formed on the opposite side. The strip is wound onto an inner roll on edge, the longitudinal web fitting into the longitudinal groove of the adjacent turn. During winding, the strip is under considerable pre-stressing and is pressed into contact with the adjacent turn axially by means of a roller. The forces resulting from the pre-stressing and the axial contact pressure force are such that plastic deformation of the outer zone of the strip occurs so that it receives a curvature corresponding to the curvature of the periphery of the inner roll. The peripheral grooves of the roll are formed by appropriate recesses on the outside of the strip, which may at that place, for example, have a rectangular recess of a size corresponding to the cross-section of the groove.

The provision of the profilings on the side surfaces of the strip and its outer end face by rolling and/or cutting entails a considerable financial outlay. The strip tends to move laterally outwards or assume an inclined position under the coil tension, as a result of the necessarily unsymmetrical construction of the profiling, so that the dense packing of the coil with the strips side by side is impaired. Finally, machining, particularly of the outside of the strip, and with the corrosion-resistant steels usually used, results in internal stresses and undesirable hardening accompanied by embrittlement and may cause incipient permanent cracks.

The object of the invention is to reduce or obviate the above described disadvantages.

According to one aspect of this invention there is provided a method of producing a grooved roll, having an operative roll surface consisting of metal, said method comprising the steps of winding, a strip helically on a cylindrical inner roller, and winding a wire holding the turns of the strip in axially spaced relationship and located between the turns of the strip at a radial distance from the operative roll periphery, the combination of the strip and wire defining the operative roll surface which has peripheral grooves therein.

According to another aspect of the invention there is provided a grooved roll, having an operative roll surface consisting of metal, consisting of a cylindrical roll onto which at least one strip is helically wound, wherein a wire extending co-directionally with the turns of the strip is disposed between the turns of the strip 3, with a radial spacing from the operative roll periphery, such wire holding the turns of the strip in spaced axial relationship, the combination of the strip and wire defining the operative roll surface which has peripheral grooves therein.

It will be appreciated that in using the present invention the peripheral grooves of the grooved roll do not have to be produced by profiling the strip. The strip can thus retain its ordinary rectangular profile. The side flanks of the peripheral grooves are formed by the facing side surfaces of the strip while the base of the groove is formed by the radially outermost face of the wire. All the profiles can be symmetrical with respect to a plane extending at right angles to the roll axis so that there is no longer any danger of inclination of the strip during winding.

The term "wire" in this specification covers any material of a substantially linear configuration, which is flexible, and has a cross-section suitable for insertion between the turns of the strip. It may also be a "strip" which is in cross-section similar to the strip forming the operative roll surface and has a smaller extent only in the radial direction than that strip to be able to form the base of the groove at the appropriate radial distance from the operative roll periphery. The expression "wire" thus in this case means simply a "strip".

Preferably, longitudinally extending grooves for guiding the wire are formed, prior to the winding operation, in the strip side surfaces which face in the axial direction.

In this way, the wire can be retained in a specific radial position between the facing side surfaces of the strip while at the same time the turns of the strip are fixed in relation to one another.

Although the provision of the grooves means that some machining work is required, the grooves need only be of a depth sufficient to retain the wire in position and the forming or cutting work required is therefore not comparable to the provision of a recess on the outside of the strip to provide the entire peripheral groove. The grooves on both sides of the strip are at the same height, because the wire engages in the opposite grooves of facing side surfaces of the strip and does not result in an unsymmetrical profile. The strip may otherwise be ordinary rolled strip of rectangular cross-section.

In order to provide definite strip support against tilting about a tangential axis at right angles to the roll axis, in the case of a wire whose cross-sectional dimension radially is substantially less than that of the strip, a second wire extending along the strip is preferably provided between the facing sides of adjacent turns between the first wire and the outer periphery of the inner roll. This wire therefore fits "below" or radially inwardly of the first wire and does not serve to bound or define the peripheral groove but simply to brace the turns of the strip in relation to one another.

More particularly, preferably the strip has a second groove on each of the axially opposite sides between the first groove and the outer periphery of the inner roll, and the other wire extending along the strip and whose diameter exceeds the sum of the groove depths is disposed between the facing side surfaces of the strip in the grooves.

The second wire is thus fixed just as is the first wire and in this way also contributes to anchoring the turns of the strip in relation to one another. The cross-section and the depth of the grooves and/or of the cross-section of the wires may be different from one another.

This may be important, for example, if the cross-section of the strip is reduced somewhat in the radially outermost region thereof as a result of the curvature during coiling, so that it deforms substantially trapezoidally. The distance between the facing side surfaces of the consecutive turns of the strip is then somewhat larger at the radially outermost region that at the radially innermost region. To ensure that the turns remain upright, compensation must be provided either by means of a wire at the radially outermost position which is somewhat thicker on the wire at the radially innermost position, given equal groove depth, or by a radially outer groove which is somewhat shallower than the radially inner groove, given equal wire diameter.

Advantageously, the adjacent turns of the strip are positively interconnected at the sides which face one another in the axial direction of the roll, such connection being provided by way of the wire or wires.

As a result, the adjacent turns are immovably fixed and a very stable roll is obtained, because the coil forming the operative roll surface is intimately connected to form a practically compact body. The adjacent turns and the wire or wires are immovably fixed so that in the event of breakage of the strip or wire or wires the coil cannot jump open. The base of the groove is also sealed as a result of the wire forming the base of the groove being connected to the adjacent turns.

Advantageously the turns may be welded together, more particularly spot-welded at intervals.

Wires having a small cross-section particularly in relation to the radial extent of the strips, give restricted welding cross-sections and can therefore be satisfactorily connected by welding.

Alternatively the turns may be soldered or glued together at the side surfaces.

In order that the invention may be more readily understood and so that further features thereof may be appreciated the invention will now be described by way of example with reference to the accompanying drawings in which:

FIG. 1 is an elevational view of a roll according to the invention;

FIGS. 2a–d show partial longitudinal sections of the surface zone of the roll with coils of different constructions;

FIG. 3 is a cross-section through a roll under production, at the coiling and grooving device; and FIG. 4 is a partial elevation corresponding to FIG. 3 from above.

A roll having the general reference 10 in FIG. 1 comprises a cylindrical inner roll 1 of any suitable construction with trunnions 2 at the ends. One or more strips 3 are wound helically on the inner roll 1. The winding having the general reference 4 extends over the entire surface of the inner roll 1 and is held at the ends by end discs 5 screwed or otherwise fixed on the inner roll 1. Strip 3 forms helically extending peripheral grooves 6 at the surface of the coil 4.

Rolls of this kind are used, for example, as dewatering rolls in the paper industry.

The construction of various embodiments of the roll 10 at the surface is illustrated in detail in FIGS. 2a–2d.

The strips 3, 3', 3'', 3''' each have a rectangular cross-section and are wound on edge around the inner roll 1 so that the longer sides of the cross-section extend substantially in radial planes at right angles to the axis of the inner roll 1 and the strips 3, 3', 3'', 3''' bear on the outer periphery of the inner roll 1 by the inner shorter sides of the cross-section, while their opposite outer shorter sides 9 form the operative roll periphery.

The individual turns of the strips 3, 3', 3'', 3''' are not in direct contact with one another at their side surfaces 12. 13 which are situated opposite one another axially, but adjacent turns are axially spaced by wires 11, 11'', 11'''. The radially outermost surfaces of the wires 11, 11'', 11''' are at a radial distance a from the operative roll periphery formed by the surfaces 9, such distance corresponding to the depth of the peripheral grooves 6. The outer zones of the axial side surfaces 12, 13 of the strips 3, 3', 3'', 3''' thus form the side flanks of the peripheral grooves 6, while the wires 11, 11'', 11''' form the bases of the grooves.

Figures 2A, 2B, 2C, 2D:
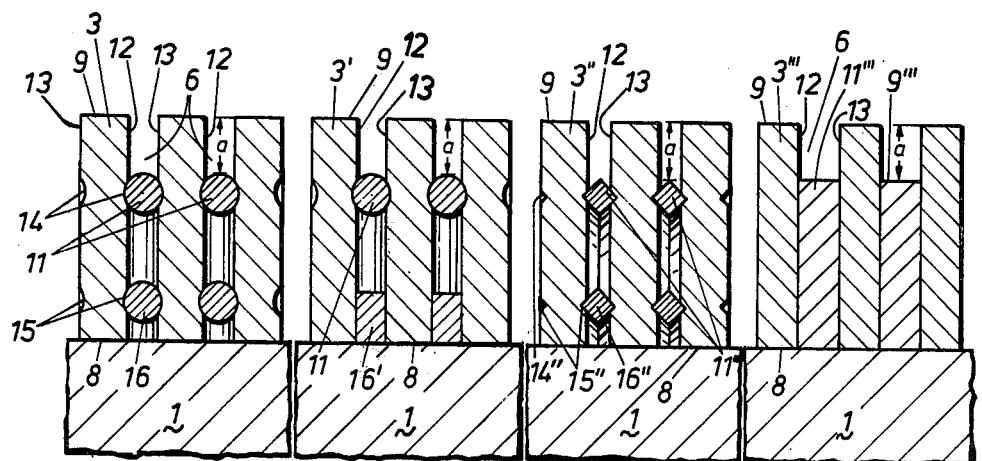

In the embodiment of the invention exemplified by FIG. 2a, the wires 11 have a circular cross-section and are disposed in arcuate sectioned grooves 14 in the strips 3 provided on the opposite axial side surfaces 12, 13 of the strips 3 at the same height, i.e. opposite one another. The wires 11 extend co-directionally with the strip 3 in the grooves 14 continuously between the turns of the strip.

Beneath the wire 11, i.e. between the latter and the outer periphery of the inner roll 1, the strip 3 also has grooves 15 extending longitudinally and disposed at the same height on both axial side surfaces 12, 13, another wire 16 being provided in these grooves 15 between the adjacent turns of the strip 3. The strip 3 is supported by the two wires at two radially spaced points and cannot therefore tilt about an axis at right angles to the drawing plane.

In the embodiment exemplified by FIG. 2b the wire 16 is replaced by a rectangular sectioned wire 16' wound directly on the outer periphery of the inner roll 1 between the turns of the strip 3. The wire 11 is arranged in the same way as in the left-hand exemplified embodiment in FIG. 2a. In the arrangement according to the second exemplified embodiment from the left, there is no need to provide the groove 15.

In the embodiment exemplified third by FIG. 2c, square sectioned wires 11'', 16'' are provided which are arranged in a corresponding manner to the wires 11, 16. The grooves 14'', 15'' in the two side surfaces of the strip 3'' have a corresponding V cross-sectional shape. Wires with cross-sections of this kind may have advantages, because the fixing in the radial direction in the grooves is more secure than with circular cross-sections.

If the strip used for the strips 3, 3' and 3'' in FIGS. 2a, b, and c is of originally rectangular cross-section then since the latter strips are elongated at the radially outer side during winding, winding results in a reduction in width in the transverse direction, i.e. in the axial direction, at the radially outermost edge with the result that the strips are provided with a slightly frusto-pyrimidal outwardly tapering cross-section. To compensate for this deformation and to ensure that the strips 3, 3', 3'' nevertheless are always at right angles to the axis of the inner roll 1, the grooves 14, 15; 14'', 15'' either have different depths for identical cross-sections of the wires 11, 16; 11', 16', or else the wire cross-sections are adapted accordingly for identical groove cross-sections, so that the distance produced by the wires between the facing side surfaces of the strips 3, 3'' is somewhat larger at the radially outer location. The same applies to the dimensioning of the wires 11, 16' in FIGS. 2a and b.

In the exemplified embodiment in FIG. 2d, only one additional "wire" 11''' is provided and this wire 11''' is constructed as a rectangular cross-section strip and is wound on edge on the outer periphery of the inner roll 1 between the turns of the strip 3'''. The shorter side of the cross-section of the wire 11''' determines the axial distance between the turns of the strip 3''', while the longer side, i.e. the width of the wire 11''' is less than the radial extent of the strip 3''' so that the outer boundary 9''' of the wire 11''' is lower than the outer boundary 9 of wire 3''' forming the operative roll periphery. In this way, the groove 6 is formed between the facing side surfaces of the strip 3''' and outside the outer boundary 9''' of the wire 11'''. In this embodiment it is not necessary to form grooves in the strip 3'''.

FIG. 3 diagrammatrically shows one way of producing the winding. The inner roll 1 is rotated in the direction of arrow 17 on a lathe or a similar device and the strip 3 is wound on it as shown in FIG. 3. Strip 3 first enters from the right in the form of a non-treated rectangular profiled strip 18 and then passes through two treatment stations 30 which engage the strip 18 at different sides. Each treatment station comprises a support for the strip 18 in the form of a guide rail 31 through which the strip 18 slides. It is pressed by two guide rollers 32 in each case against the guide rail 31, the rollers being disposed at the end of the rail 31. The milling cutter 33 engages the strip 18 between the guide rolls 32 and consists of two superimposed side milling cutters 34.

Cutters 34 produce the two superimposed grooves 14, 15 in the strip 18 as it passes. The treatment stations 30 engage the opposite sides of the strip 18 and produce grooves 14, 14 and 15, 15 on these two sides at the same height.

Instead of the side milling cutters 34, other suitable profiling tools may be used, e.g. a drawing tool. The profiling operation may also be carried separately of the coiling operation and pre-profiled material may be used for the coiling operation.

After the grooves 14, 14 and 15, 15 have been formed, the non-profiled strip 18 becomes the strip 3 shown in the left-hand embodiment in FIG. 2a.

After leaving the second treatment station 30, strip 3 in the embodiment shown in FIGS. 3 and 4 passes a guide roller 35 which, with the same spacing as that of the grooves 14, 14 and 15, 15 and at their height, has peripheral grooves 36 by means of which the wire 11 and the wire 16 (not shown in FIG. 4) are guided against the strip 3 and into its grooves 14, 14 and 15, 15. The strip 3 and the wires 11, 16 are jointly wound in the manner shown in FIG. 4, the wires 11, 16 between the turns of the strip 3 providing the correct distance between the individual turns.

In order to obtain a dense axial packing of the coil and good contact of the axially abutting surfaces of the strip 3 and wires 11, 16 contact pressure rollers 20, 21, 22, 23 are provided, to exert an axial pressure on the turn being applied to the roll, roller 20 being provided near the point where the strip 3 runs on to the inner roll 1. The rollers 21, 22, 23 are distributed over the periphery of the first turn.

During the winding operation, the strip 3 is deformed and this does not cause any difficulty because it is kept under vigorous tensile stress and guided by the rollers 20, 21, 22, 23. The dimensions of the strip 3 depend on the dimensions required for the peripheral groove 6 and the webs left therebetween. For example, the strip may have a height of 10 to 12 mm and a thickness of 2 to 4 mm. The material is preferably corrosion-resistant steel although any other metal may be used. The same applies to the wires 11, 11', 11'' and 16, 16' to be introduced between the turns of the strip 3.

FIG. 3 also shows a welding head 24 which in the exemplified embodiment is constructed as a spot welding head and provides weld spots at regular intervals axially, as shown at 25 in FIG. 3, interconnecting the individual turns of the strip 3 to the wires 11 and 16, and to one another. Given a normal roll diameter of about 300 to 800 mm, the spot welds may, for example, be provided at regular intervals of about 100 mm.

The wires may alternatively be continuously welded to the strips 3, 3', 3'',3''' and also be soldered or glued thereo.

What I claim is:

1. In a grooved drum comprising a working drum surface of metal including a cylindrical inner drum, on which at least one ribbon is wound helically, turn by turn, to form, with its radially outer boundary, the working drum surface, said ribbon also forming axially spaced circumferential grooves in the drum surface, the improvement comprising:
   (a) a first groove on each side of said ribbon opposing each other in the axial direction, said first groove running in a lengthwise direction at a distance, corresponding to the depth of the circumferential groove, from the outer boundary of the ribbon and at a radial distance from the working drum surface; and
   (b) at least one wire wound between turns of the ribbon, holding adjacent turns of the ribbon at an axial spacing, arranged in said grooves between sides of adjacent turns of the ribbon facing each other, said wire having a diameter which exceeds the sum of the first groove depths, by an amount corresponding to the width of the circumferential groove.

2. The improvement according to claim 1 and further including a second continuous wire running alongside the ribbon between the sides of adjacent turns facing each other, and between the first wire and the outer circumference of the inner drum.

3. The improvement according to claim 2 and further including a second groove on each of the sides of the ribbon opposing each other in the axial direction between the first groove and the outer circumference of the inner drum at equal distances from the outer circumference of the inner drum, and wherein said further continuous wire which runs alongside the ribbon and has a diameter which exceeds the depths of the second grooves and is arranged in the second grooves between the lateral surfaces of the ribbon facing each other.

4. The improvement according to claim 3 wherein the cross section and the depth of the first and second grooves and/or the cross section of the wires are different from each other.

5. The improvement according to claim 1 wherein adjacent turns of the ribbon are connected to each other in a form locking manner through the wire on the sides facing each other in the direction of the axis of the drum.

6. The improvement according to claim 5 wherein said turns are welded together.

7. The improvement according to claim 6 wherein said turns are spot welded together at intervals.

8. The improvement according to claim 5 wherein said turns are soldered to each other.

9. The improvement according to claim 5 wherein said turns are cemented to each other.

10. The improvement according to claim 1 wherein the cross section and the depth of the first and second grooves are different from each other.

11. A method of constructing a grooved drum comprising winding a ribbon helically on a cylindrical inner drum to form a working surface with axially spaced circumferential grooves, wherein the improvement comprises:
(a) forming an axial groove in each side of ribbon, spaced a distance from the bottom thereof, and a distance from the top thereof corresponding to the desired depth of the circumferential grooves, and extending in the lengthwise direction;
(b) winding said ribbon on the inner drum with a wire between adjacent turns thereof, said wire disposed in said grooves and thus being at a radial spacing from the working surface of the drum, so as to hold adjacent turns of the ribbon at an axial spacing; and
(c) selecting as the wire to be used a wire which has a diameter which exceeds the sum of the groove depths by an amount corresponding to the desired width of the circumferential groove on the roll.

12. The improvement according to claim 1, wherein the cross section of the first and second grooves and the cross section of the wires are different from each other.